United States Patent
Bostick et al.

(10) Patent No.: US 7,844,673 B2
(45) Date of Patent: Nov. 30, 2010

(54) FILTERING FEATURES FOR MULTIPLE MINIMIZED INSTANT MESSAGE CHATS

(75) Inventors: James E. Bostick, Cedar Park, TX (US); Randolph M. Forlenza, Austin, TX (US); John P. Kaemmerer, Pflugerville, TX (US); Raghuraman Kalyanaraman, Austin, TX (US); Courtney J. Spooner, Hutto, TX (US)

(73) Assignee: International Business Machines Corporation, Armonk, NY (US)

( * ) Notice: Subject to any disclaimer, the term of this patent is extended or adjusted under 35 U.S.C. 154(b) by 795 days.

(21) Appl. No.: 11/257,451

(22) Filed: Oct. 24, 2005

(65) Prior Publication Data
US 2007/0094341 A1    Apr. 26, 2007

(51) Int. Cl.
*G06F 15/16* (2006.01)
(52) U.S. Cl. ...................................................... 709/206
(58) Field of Classification Search ................... 709/206
See application file for complete search history.

(56) References Cited

U.S. PATENT DOCUMENTS

| | | | |
|---|---|---|---|
| 5,821,936 A | 10/1998 | Schaffer et al. | |
| 5,963,207 A | 10/1999 | Brewer et al. | |
| 5,977,973 A | 11/1999 | Sobeski et al. | |
| 6,069,628 A | 5/2000 | Farry et al. | |
| 6,118,428 A | 9/2000 | Blackmon et al. | |
| 6,301,609 B1 | 10/2001 | Aravamudun et al. | |
| 6,459,892 B2 | 10/2002 | Burgan et al. | |
| 6,661,435 B2 | 12/2003 | Nason et al. | |
| 6,785,708 B1 | 8/2004 | Busey et al. | |
| 6,907,447 B1 | 6/2005 | Cooperman et al. | |
| 7,333,976 B1 * | 2/2008 | Auerbach et al. | 707/3 |
| 7,421,661 B1 * | 9/2008 | Canfield et al. | 715/752 |
| 7,617,283 B2 * | 11/2009 | Aaron et al. | 709/206 |
| 2001/0006382 A1 | 7/2001 | Sevat | |
| 2002/0035605 A1 | 3/2002 | McDowell et al. | |
| 2002/0054141 A1 | 5/2002 | Yen et al. | |
| 2002/0080184 A1 | 6/2002 | Wishoff | |
| 2002/0130904 A1 * | 9/2002 | Becker et al. | 345/753 |
| 2003/0088623 A1 * | 5/2003 | Kusuda | 709/204 |
| 2003/0134678 A1 | 7/2003 | Tanaka | |
| 2004/0056893 A1 * | 3/2004 | Canfield et al. | 345/753 |
| 2004/0148346 A1 * | 7/2004 | Weaver et al. | 709/204 |
| 2004/0203656 A1 | 10/2004 | Andrew et al. | |
| 2004/0254998 A1 | 12/2004 | Horvitz | |
| 2004/0267701 A1 | 12/2004 | Horvitz et al. | |
| 2005/0086586 A1 | 4/2005 | Kim | |

(Continued)

OTHER PUBLICATIONS

USPTO office action for U.S. Appl. No. 11/257,453 dated Aug. 24, 2009.

(Continued)

*Primary Examiner*—Kenny S Lin
(74) *Attorney, Agent, or Firm*—Yee & Associates, P.C.; William H. Steinberg; Rudolf O. Siegesmund

(57) ABSTRACT

A user is notified of activity in an instant messaging session by receiving a selection input signal from a selection device. When the selection input signal is received, a minimized chat window is detached from a task bar and moved to a position on a display indicated by the selection input signal. A slot is displayed in the detached chat window for each open instant messaging session.

12 Claims, 5 Drawing Sheets

U.S. PATENT DOCUMENTS

| | | | |
|---|---|---|---|
| 2005/0149606 A1* | 7/2005 | Lyle et al. | 709/200 |
| 2006/0009243 A1 | 1/2006 | Dahan et al. | |
| 2006/0036703 A1* | 2/2006 | Fulmer et al. | 709/207 |
| 2007/0033254 A1 | 2/2007 | AlHusseini et al. | |
| 2007/0094341 A1 | 4/2007 | Bostick et al. | |
| 2007/0094342 A1* | 4/2007 | Bostick et al. | 709/207 |
| 2008/0178096 A1* | 7/2008 | Kusuda | 715/758 |
| 2008/0184170 A1* | 7/2008 | Periyalwar | 715/841 |

OTHER PUBLICATIONS

USPTO final office action for U.S. Appl. No. 11/257,453 dated Feb. 27, 2009.

USPTO office action for U.S. Appl. No. 11/257,453 dated Sep. 12, 2008.

USPTO final office action for U.S. Appl. No. 11/257,452 dated May 1, 2009.

USPTO office action for U.S. Appl. No. 11/257,452 dated Oct. 2, 2008.

USPTO office action for U.S. Appl. No. 11/257,453 dated Mar. 19, 2010.

USPTO office action for U.S. Appl. No. 11/257,452 (AUS920050588US1) dated Jun. 22, 2010.

* cited by examiner

FILTERING FEATURES FOR MULTIPLE MINIMIZED INSTANT MESSAGE CHATS

RELATED APPLICATIONS

This application is related to patent application Ser. No. 11/257,452, "Detachable Control Window for Instant Messaging Chats," filed Oct. 24, 2005.

CROSS-REFERENCE TO RELATED APPLICATION

The present invention is related to the subject matter of U.S. patent application Ser. No. 11/257,452, incorporated herein by reference.

FIELD OF THE INVENTION

The present invention is related generally to demand-based messaging systems, and in particular to graphical user interfaces for controlling chat sessions in an instant messaging application.

BACKGROUND OF THE INVENTION

Demand-based messaging is a communication service that allows people to exchange message data, such as text, over a network or other communications media, in real time. Probably the most common medium for exchange is the Internet, but as wireless phone networks continue to expand, their popularity for text messaging is also expanding. U.S. Pat. No. 6,301,609 issued to Aravamudan et al., and U.S. Patent Publications Nos. 2002/0035605 and 2004/0254998, for example, illustrate the move toward an exchange medium that unifies traditional and wireless communications. Instant messaging (IM) is perhaps the most widely known and used embodiment of demand-based messaging. Today, most network and online service providers offer some form of IM service. According to some estimates, the top three instant messaging service providers serve over forty million users. Instant messaging services also are being rapidly deployed and integrated into enterprise infrastructure. International Business Machines, Inc. (IBM), for example, has deployed LOTUS SAMETIME instant messaging applications for employees world-wide. Other examples of IM applications that are popular today include MSN Messenger and Yahoo/AOL Instant Messenger.

IM users typically use a networked computer and an IM client program to exchange messages with one another in conversational style. An IM client provides an interface for users to compose, send, receive, and read messages. In a graphical display, an IM client usually includes at least two windows: a window for composing and sending messages, and a window for displaying messages as users take turns sending and receiving them. IM sessions (colloquially referred to as "chats") are often lengthy, with multiple participants each taking many turns "speaking" in the chat window. Generally, a user initiates a chat by sending a chat request to a second IM user (or group of IM users). The request may also include the first message from the user. The chat is "open" after the second IM user accepts the request or otherwise responds to it, and typically remains open until one user affirmatively closes the chat. It is common for one user to have multiple IM chats open simultaneously, usually in separate windows.

In many of today's graphical operating systems, including the MICROSOFT WINDOWS family of operating systems, windows can be "minimized" as needed to organize the information on a given display. As that term is used popularly, a window is "minimized" when it is reduced to an icon so that it uses only a small portion of the display. Typically, icons representing minimized windows are grouped together and placed along the edge of a screen in a graphical element commonly referred to as a "task bar." Of course, not much information about a window is visible when the window is minimized. When a chat window is minimized, for example, a user will generally see only a short title and, perhaps, a sender's name. FIG. 1 illustrates an exemplary graphical display 100 with icon 105, task bar 110, command button 115, minimized application windows 120-125, minimized chat window 130, and minimized chat window 135. Note that in FIG. 1, minimized chat windows 130 and 135 display the sender's names ("Al" and "Bill", respectively).

As the number of windows in a graphical display increases, the operating system typically decreases the size of icons in the task bar and the length of the text displayed in each icon. Thus, as FIG. 2 illustrates, even a sender's name may not be completely visible in a minimized chat window and it becomes difficult for a user to determine the nature of the chat without constantly restoring the chat window to its full size. In FIG. 2, minimized application window 140 has been added to task bar 110, and minimized chat windows 130 and 135 have been compressed to make room for the new icon. Note that the sender's name is no longer visible in minimized chat window 135.

Moreover, the operating system may compress all chat windows into a single icon in the task bar if there are too many icons to display at once. If all chat windows are so compressed, all identifying attributes of the various chats are lost to the user. FIG. 3 illustrates this scenario, in which minimized application window 145 has been added to task bar 110. Because there is no longer room to display all minimized windows in the task bar, the operating system has compressed minimized chat windows 130 and 135 into a single, new minimized group window 150. As FIG. 3 illustrates, minimized group window 150 does not display any chat-specific information.

Some conventional IM clients also include limited means for notifying a user when a user receives a new message or the chat is otherwise "active." An "active" chat, as that term is used here, is an open chat in which at least one message has been transmitted since the user last viewed the chat window. Common techniques include causing the window (minimized or not) to blink. Such techniques, though, do little to focus attention to a specific chat when multiple chat windows are compressed into a single minimized group. U.S. Pat. No. 6,907,447 (issued Jun. 14, 2005) addresses this shortcoming to some extent, disclosing a "Method and Apparatus for Providing an Instant Message Notification" that provides a sender's identification and the message topic in a separate window that "pops up" when a user receives a new message.

Either the operating system or the IM client also may display information about a given chat when a user "hovers" a pointer or cursor over a minimized chat window. In this context, the term "hover" refers to placing the pointer over the minimized window and leaving the pointer in such a position for a period of time determined by the operating system or the IM client. The time period typically is only a second or two. Generally, the operating system or IM client displays information such as the user's name and the application's name, usually in a pop-up window or "cloud" element.

Thus, existing messaging applications that rely on an operating system to manage chat windows are too cumbersome for effectively organizing and using multiple chat windows, and there remains a need to advance the state of the art of demand-based messaging to overcome these shortcomings.

SUMMARY OF THE INVENTION

The invention described in detail below is a method of notifying a user of activity in an instant messaging session in a computer having a graphical user interface including a display, a selection device, and a network connection, the method comprising: receiving a selection input signal from the selection device indicating the selection and movement of a minimized chat window in a task bar; responsive to receiving the selection input signal, detaching the minimized chat window from the task bar and moving the detached chat window to a position on the display indicated by the selection input signal; receiving a configuration input signal from the selection device indicating the selection of a display configuration parameter; and displaying a slot in the detached chat window for each open instant messaging session according to the display configuration parameter.

In an alternative embodiment, the method is encoded as a computer program in a computer-readable memory.

In yet another alternative embodiment, the method is encoded as a computer program in a computer-readable memory coupled to a processor.

BRIEF DESCRIPTION OF DRAWINGS

The novel features believed characteristic of the invention are set forth in the appended claims. The invention itself, however, as well as a preferred mode of use, further objectives and advantages thereof, will be understood best by reference to the following detailed description of an illustrative embodiment when read in conjunction with the accompanying drawings, wherein:

DETAILED DESCRIPTION OF THE PREFERRED EMBODIMENT

The principles of the present invention are applicable to a variety of computer hardware and software configurations. The term "computer hardware" or "hardware," as used herein, refers to any machine or apparatus that is capable of accepting, performing logic operations on, storing, or displaying data, and includes without limitation processors and memory; the term "computer software" or "software," refers to any set of instructions operable to cause computer hardware to perform an operation. A "computer," as that term is used herein, includes without limitation any useful combination of hardware and software, and a "computer program" or "program" includes without limitation any software operable to cause computer hardware to accept, perform logic operations on, store, or display data. A computer program may, and often is, comprised of a plurality of smaller programming units, including without limitation subroutines, modules, functions, methods, and procedures. Thus, the functions of the present invention may be distributed among a plurality of computers and computer programs. The invention is described best, though, as a single computer program that configures and enables one or more general-purpose computers to implement the novel aspects of the invention. For illustrative purposes, the inventive computer program will be referred to as the "chat filter" program.

Figure 4:
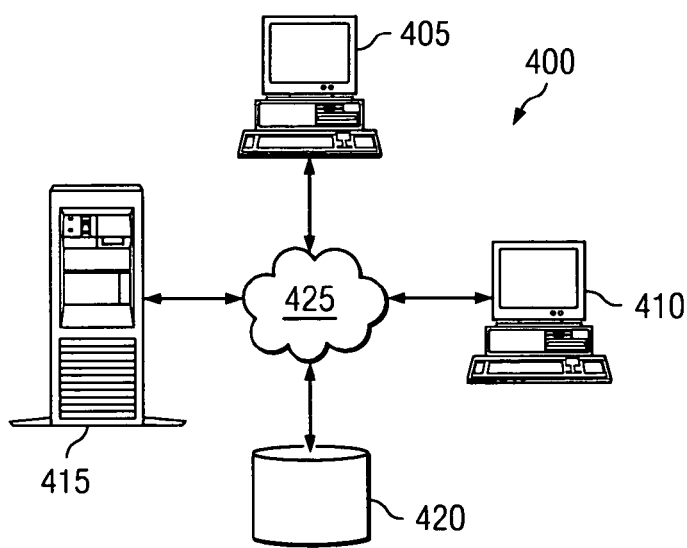
FIG. 4 illustrates an exemplary network of hardware devices in which the present invention can be practiced.

Additionally, the chat filter program is described below with reference to an exemplary network of hardware devices, as depicted in FIG. 4. A "network" comprises any number of hardware devices coupled to and in communication with each other through a communications medium, such as the Internet. A "communications medium" includes without limitation any physical, optical, electromagnetic, or other medium through which hardware or software can transmit data. For descriptive purposes, exemplary network 400 has only a limited number of nodes, including workstation computer 405, workstation computer 410, server computer 415, and persistent storage 420. Network connection 425 comprises all hardware, software, and communications media necessary to enable communication between network nodes 405-420. Unless otherwise indicated in context below, all network nodes use publicly available protocols or messaging services to communicate with each other through network connection 425.

Figure 5:
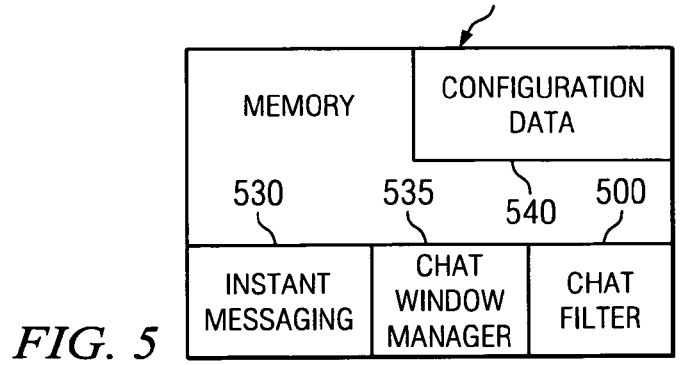
FIG. 5 is a schematic of a memory having components of the present invention stored therein.

Chat filter 500 typically is stored in a memory, represented schematically as memory 520 in FIG. 5. The term "memory," as used herein, includes without limitation any volatile or persistent medium, such as an electrical circuit, magnetic disk, or optical disk, in which a computer can store data or software for any duration. A single memory may encompass and be distributed across a plurality of media and network nodes. Thus, FIG. 5 is included merely as a descriptive expedient and does not necessarily reflect any particular physical embodiment of memory 520. As depicted in FIG. 5, though, memory 520 may include additional data and programs. Of particular importance to chat filter 500, memory 520 may include instant messaging (IM) program 530, chat window manager 535, and configuration data 540, with which chat filter 500 interacts. IM program 530 represents any demand-based messaging software that provides an interface through which a user can access a messaging service and exchange messages with other users. Configuration data 540 represents any data source (including without limitation a file, table, or database) that identifies one or more of a user's preferences for displaying or filtering information about a chat window. In practice, chat filter 500 may be integrated with IM program 530, but also may exist independently as an add-on module.

In a preferred embodiment, chat window manager 535 also includes a graphical user interface (GUI), through which a user can interact with and control the program. The design and operation of a GUI is well-known in the art and need not be described in detail herein, but in general a GUI typically includes a display and a selection device. Common selection devices include mice, trackballs, touch pads, touch screens, and the like. An operating system or other program having a GUI draws graphical elements on the display. The graphical elements generally include windows, command buttons, and text boxes. A pointer or cursor also is usually drawn on the display to indicate the position of the selection device with respect to the display. To control a computer through a GUI, a user typically moves the selection device until the pointer is in a desired position, and then presses a button on the device (or simply touches the pad or screen). The device then sends a signal to the processor, indicating the position of the pointer and the user's action (i.e. which button the user pressed and how many times). The processor then responds to the signal according to the computer program associated with pointer position.

Chat window manager 535 organizes chat windows independent of the operating system's control. In particular, chat window manager 535 manages chat windows independent of a system's task bar. Chat window manager 535 may place a chat window in a system's task bar to present the user with a conventional view, but chat window manager 535 also gives the user additional options for configuring the display. These options, and the significant advantages that they offer, are described in more detail below.

Chat window manager 535 includes several user interface features for controlling the behavior of chat windows, including a control window. In one embodiment, the control window is an independent IM task bar control that can be detached from an operating system's task bar. Alternatively, the control window may be integrated into an existing icon in the operating system task bar. The control window allows a user to customize the behavior of chat window, detach the control window from a taskbar, resize the control window, and select display attributes such as font, text size, and color. The user can also configure the control window to always stay on top of other windows on the display.

Figure 1:
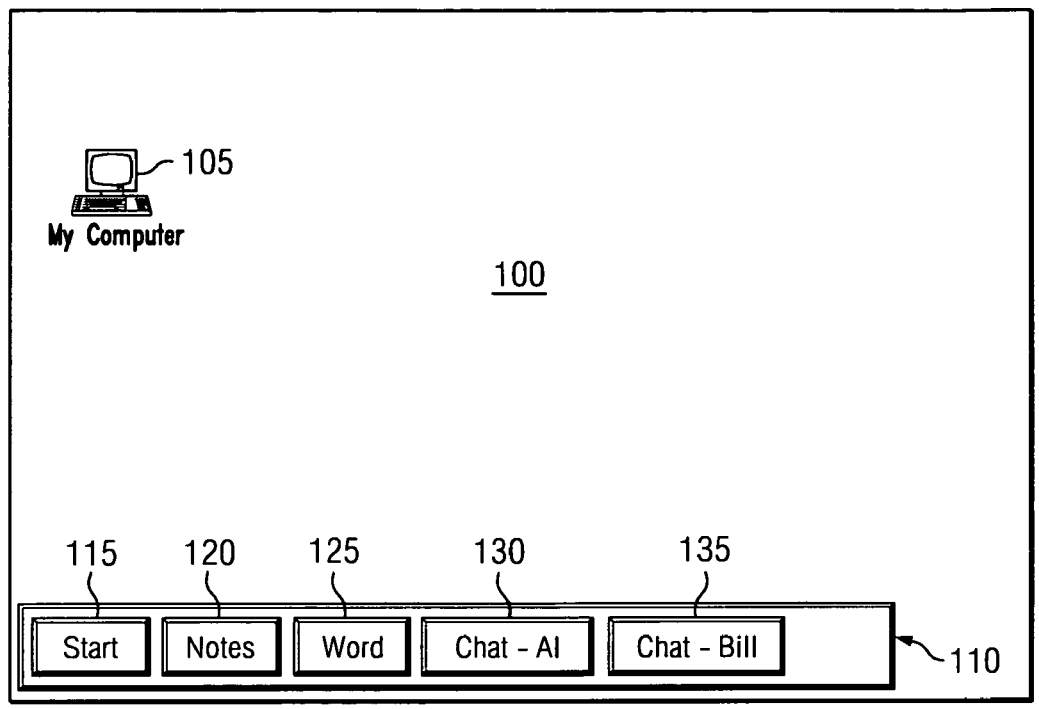
FIG. 1 illustrates an exemplary prior art graphical display having two minimized chat windows.
Figure 2:
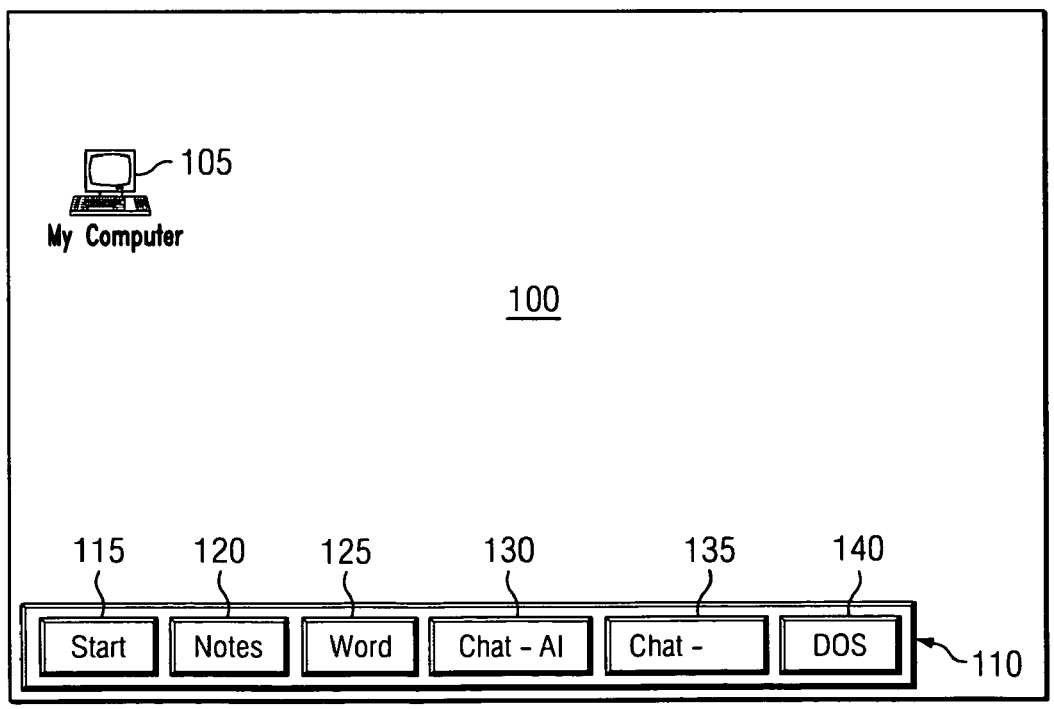
FIG. 2 illustrates an exemplary prior art graphical display having two compressed minimized chat windows.
Figure 3:
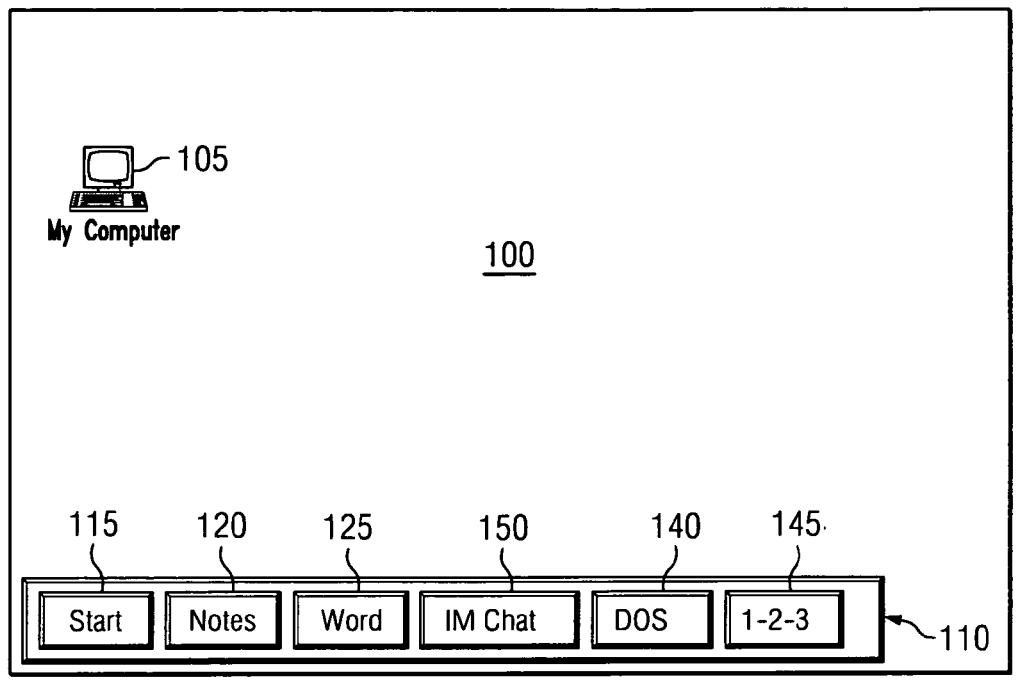
FIG. 3 illustrates an exemplary prior art graphical display having a minimized group window of chats.
Figure 6A:
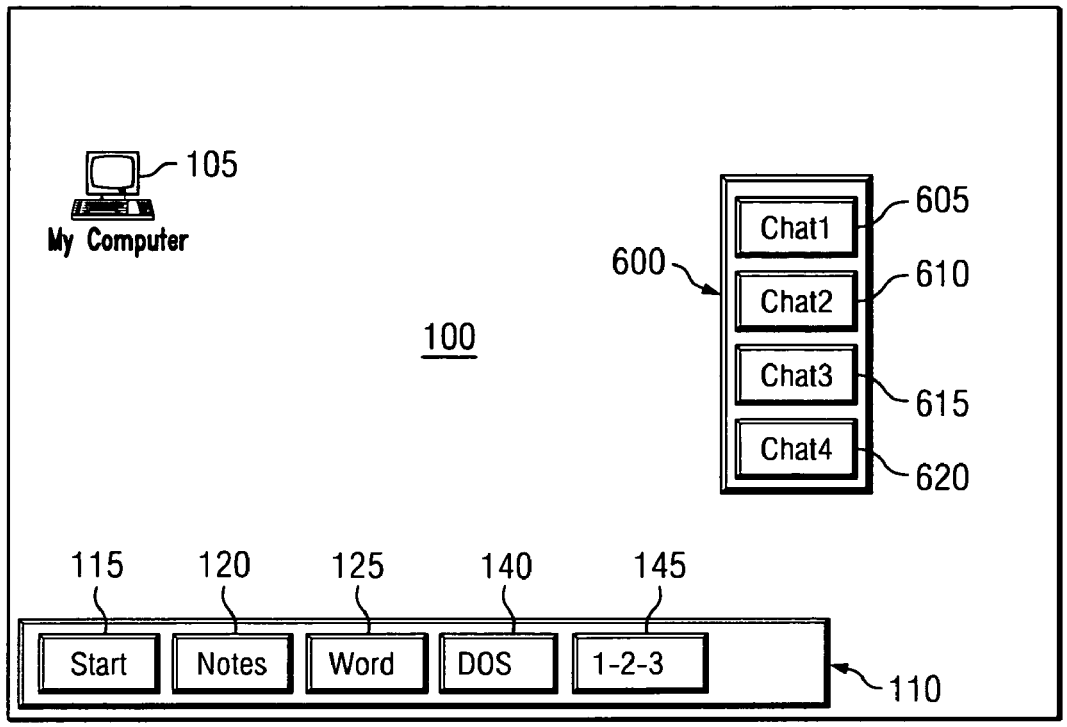
FIG. 6A illustrates an exemplary control window detached from the operating system task bar.
Figure 6B:
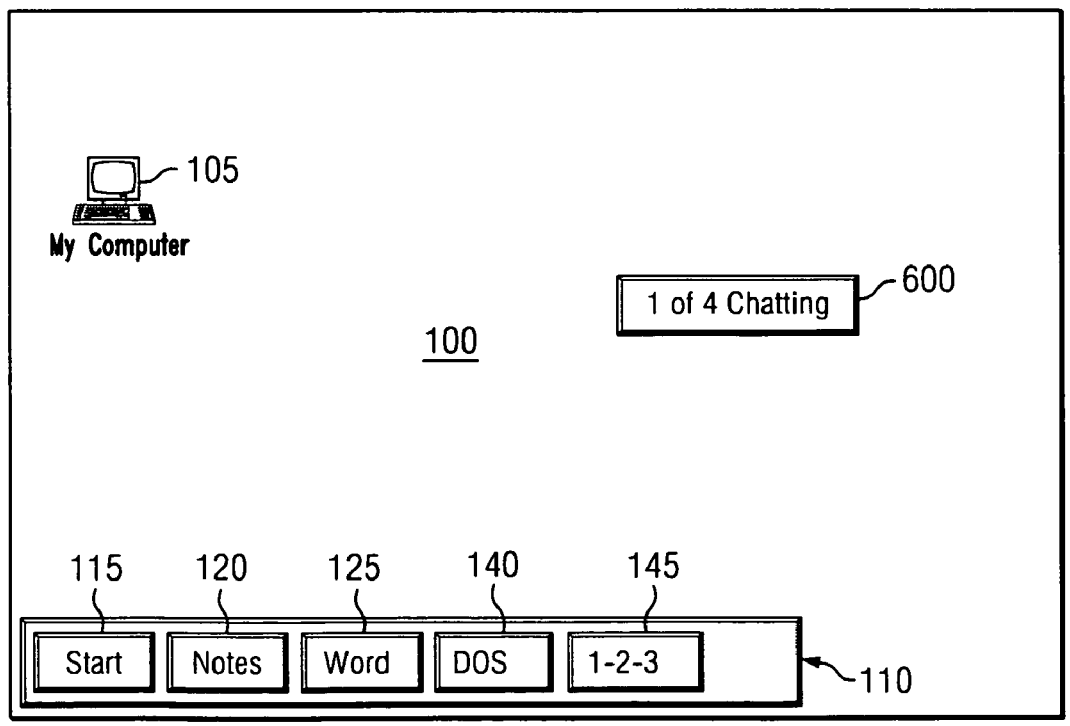
FIG. 6B illustrates an exemplary minimized control window detached from the operating system task bar.

Once detached, the control window may be moved to any part of the user's display. FIG. 6A illustrates exemplary control window 600 detached from the operating system task bar 110, in which four chats are open. Each graphical subdivision (referred to herein as "slots" 605-620) in control window 600 represents an open chat. This exemplary embodiment illustrates that only one detached control window 600 is needed, instead of multiple minimized chat windows in task bar 110, as seen in FIGS. 1 and 2. Control window 600 also may be minimized, as seen in FIG. 6B. In one embodiment, chat window manager 535 displays the number of chats that are open and how many are active if control window 600 is minimized. This feature also is illustrated in FIG. 6B, represented by the text "1 of 4 chatting" in minimized control window 600. A user may restore minimized control window 600 to its maximized state by clicking it or by hovering a pointer over it for a given time. Alternatively or additionally, chat window manager 500 may restore minimized control window 600 if a new message is received or a new chat session opened.

Figure 7A:
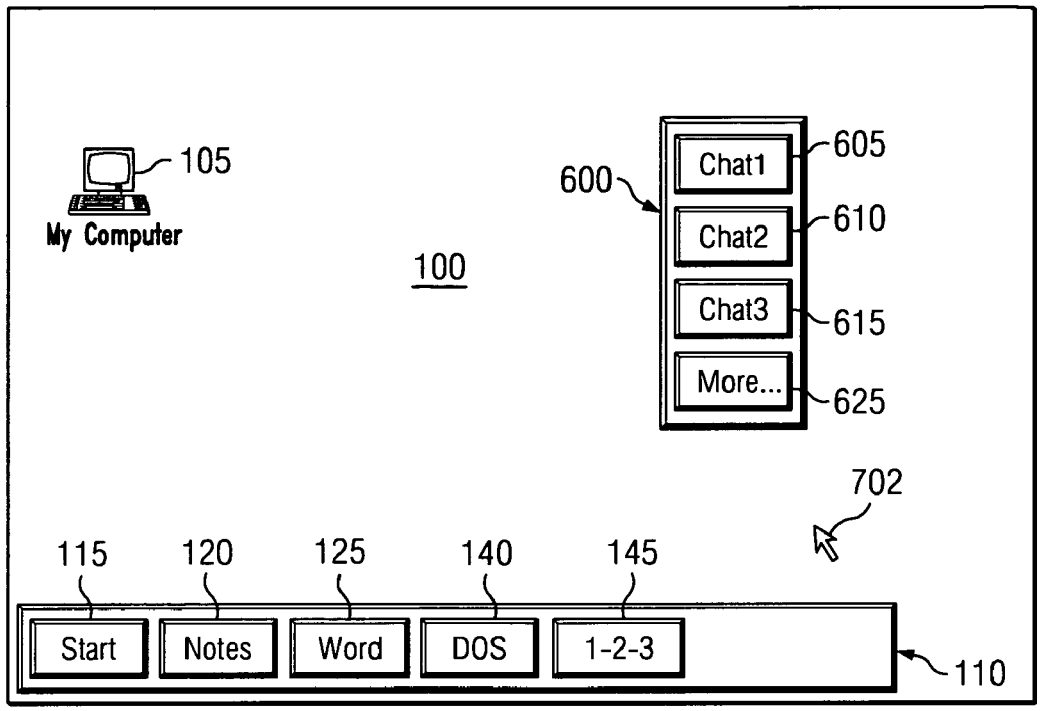
FIG. 7A illustrates an exemplary compressed control window.
Figure 7B:
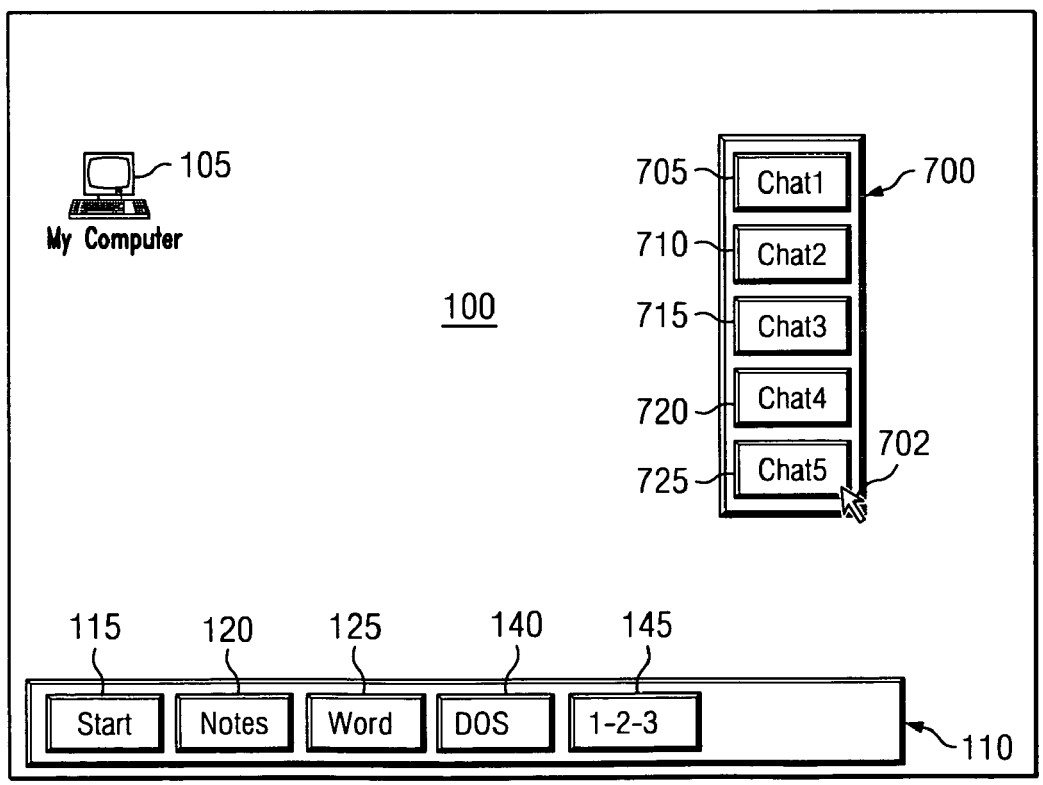
FIG. 7B illustrates an exemplary compressed control window with a pop-up list of chats.

Chat window manager 535 also can compress chat information in control window 600 if the size of control window is insufficient to display all information. In FIG. 7A, for example, a fifth chat is open but neither the user nor chat window manager 535 has enlarged the window to accommodate the additional information. As a result, not all information can be displayed and slot 620 is replaced by slot 625, indicating that more chats are open. As shown in FIG. 7B, though, chat window manager 535 creates pop-up list 700 having slots 705-725 (representing all five chats) if a user places a pointer, such as pointer 702, over compressed control window 600. If compressed control window 600 were located along the left or right edge of the display, then pop-up list 700 would be displayed to the right or left of compressed control window 600, respectively. Likewise, pop-up list 700 would be displayed above or below compressed control window 600 if compressed control window 600 were located along the bottom or top edge of the display, respectively.

Figure 8:
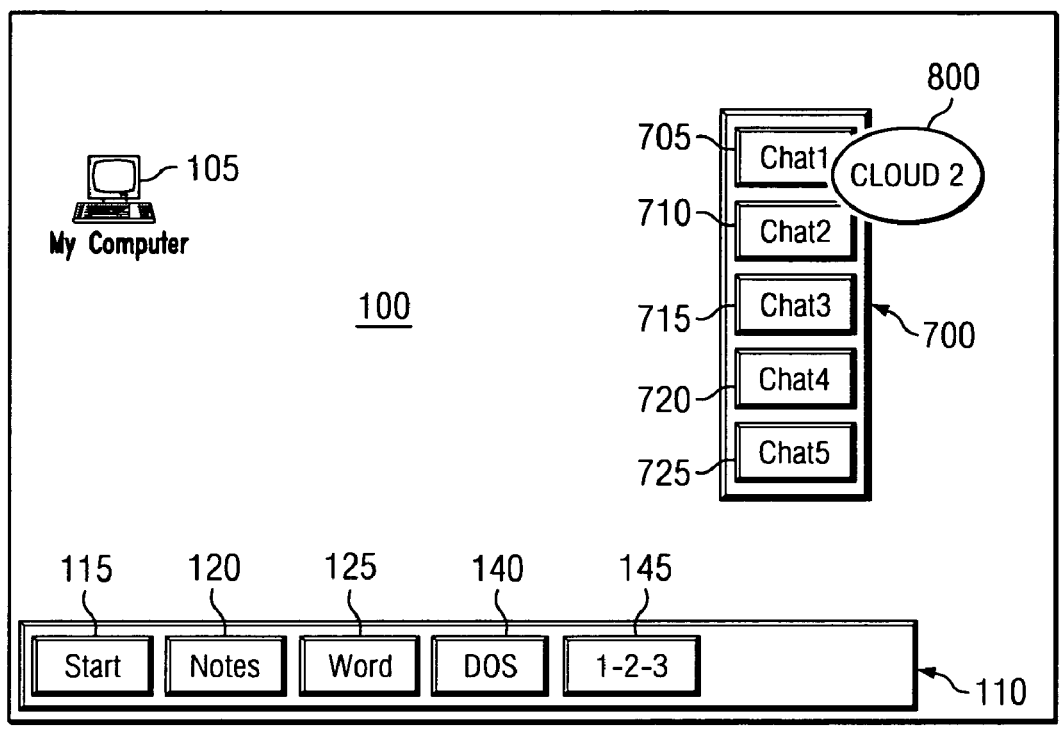
FIG. 8 illustrates the effects of selecting a slot in a control window.

From open control window 600 or from pop-up list 700, a user can select a particular chat slot to obtain additional information about the particular chat. Various means for selecting a slot are contemplated, but placing a pointer over the entry and hovering for a given time or clicking a button on the pointing device are preferred means. After a user selects a particular chat slot, chat window manager 535 displays descriptive chat data in a separate pop-up window or "cloud," which FIG. 8 illustrates as cloud 800. Alternatively or additionally, a user may select a particular chat slot to have chat window manager 535 open the particular chat in a chat window.

As described above, chat window manager 535 manages the creation and placement of various windows in an IM application and may display information about open instant messaging sessions in those windows. Chat filter 500 augments chat window manager 535 and provides controls for the user to configure the content that chat window manager 535 displays in those windows. Configuration data 540 includes one or more display configuration parameters that control the operation of chat filter 500. Chat filter 500 also provides a GUI through which a user can set preferences for displaying or filtering information about an open chat. Exemplary modes of operation are described below to illustrate the configuration principles of the present invention.

Figure 9:
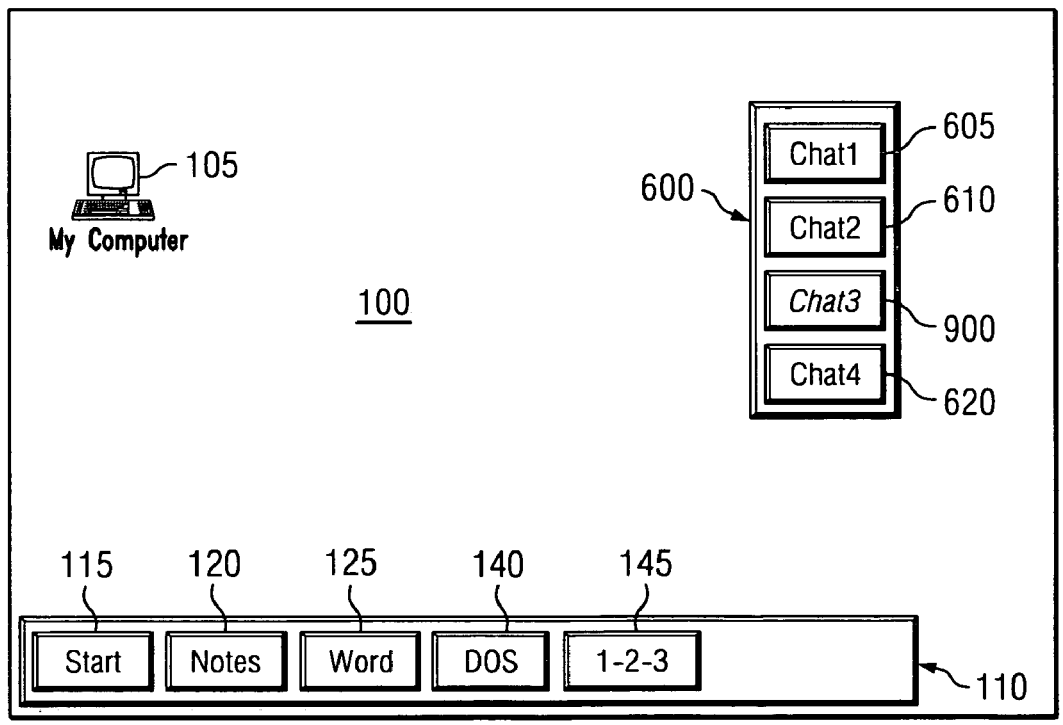
FIG. 9 illustrates one mode of operation of the present invention in which a display configuration parameter determines the appearance of information in the slots of a control window.

In one mode of operation, a display configuration parameter determines the appearance of information in slots of control window 600, such as the font or font effects of a slot's descriptive text. For example, the user may set the display configuration parameter so that the descriptive text in the slot of an active chat is italicized, as in slot 900 of FIG. 9. Alternatively, the user may set the display configuration parameter to alter the appearance of slots representing inactive chats. Other examples of configurable attributes include horizontal bars, color, blank line separators, or any combination thereof.

In another mode of operation, a display configuration parameter controls which chats that chat window manager 535 displays as a slot in control window 600. For example, a user may set the display configuration parameter so that chat filter 500 only allows chat window manager 535 to display open chats from a specified user or group of users.

Similarly, a user can set a display configuration parameter to customize the information that chat window manager 535 displays in cloud 800 and the appearance of cloud 800. For example, the user can set the display configuration parameter so that chat window manager 535 displays user-defined descriptions instead of or in addition to default data such as the sender's identification. Examples of user-defined descriptions include, without limitation, custom date formats, a sender's nickname as it is stored in the user's address book or directory, the groups to which the sender belongs, and other contact information (such as the sender's phone number, fax number, or postal address). The user also may set a display configuration parameter so that chat window manager displays some portion of the chat history (such as a fixed-size data block or a fixed number of text lines) in cloud 800.

Finally, the user can set the display configuration parameter to control the order in which information appears in any of control window 600, pop-up list 700, or cloud 800.

A preferred form of the invention has been shown in the drawings and described above, but variations in the preferred form will be apparent to those skilled in the art. The preceding description is for illustration purposes only, and the invention should not be construed as limited to the specific form shown and described. The scope of the invention should be limited only by the language of the following claims.

What is claimed is:

1. A method of notifying a user of activity in an instant messaging session in a computer having a display, a selection device, and a network connection, the method comprising:
   receiving a selection input signal from the selection device indicating the selection and movement of a minimized control window integrated into a task bar of an operating system of the computer, wherein the control window is a graphical user interface of a chat manager;
   responsive to receiving the selection input signal, detaching the minimized control window of the chat manager and moving the detached control window to a position on the display indicated by the selection input signal;
   receiving a configuration input signal from the selection device indicating the selection of a display configuration parameter, wherein the display configuration parameter specifies a particular user or a particular group of users;
   responsive to a receipt of the display configuration parameter, filtering out one or more active chats of one or more non-specified users or groups of users in the control window;
   displaying only a plurality of graphical subdivisions in the control window, wherein each graphical subdivision represents an active chat in an instant messaging program that is allowed by the display configuration parameter and can be opened by activating the graphical subdivision; and
   making the filtered one or more active chats of the one or more non-specified users or groups of users available outside the control window in the instant messaging program.

2. The method of claim 1 further comprising:
   receiving an activity input signal from the network connection indicating activity in the instant messaging session;
   modifying the appearance of a graphical subdivision in the control window representing the instant messaging session according to the display configuration parameter;
   minimizing the control window; and
   responsive to receiving a new instant message in one of the plurality of graphical subdivisions, automatically restoring the control window to a maximized size.

3. The method of claim 1 further comprising:
   receiving a second selection input signal from the selection device indicating the placement of a pointer over a graphical subdivision in the control window for a predetermined time interval; and
   responsive to receiving the second selection input signal, displaying a plurality of descriptions of the instant messaging session represented by the graphical subdivision in a cloud window according to the display configuration parameter;
   wherein the plurality of descriptions include a custom date format, a sender's nickname as the sender's nickname is stored in an address book, a group to which a sender of a message belongs, a phone number of the sender, a fax number of the sender, a postal address of the sender, and a fixed number of text lines from the chat.

4. The method of claim 2 further comprising:
   receiving a second selection input signal from the selection device indicating the placement of a pointer over a graphical subdivision in the control window for a predetermined time interval; and
   responsive to receiving the second selection input signal, displaying a plurality of descriptions of the instant messaging session represented by the graphical subdivision in a cloud window according to the display configuration parameter;
   wherein the plurality of descriptions include a custom date format, a sender's nickname as the sender's nickname is stored in an address book, a group to which a sender of a message belongs, a phone number of the sender, a fax number of the sender, a postal address of the sender, and a fixed number of text lines from the chat.

5. A computer program product for notifying a user of activity in an instant messaging session running on a computer, the computer program product comprising:
   a computer readable storage medium that does not comprise a transitory or a propagating signal;
   first program instructions for receiving a selection input signal from a selection device indicating a selection and a movement of a minimized chat window in a control window integrated into an existing icon in a task bar of an operating system of the computer, wherein the control window is a graphical user interface of a chat manager;
   second program instructions for detaching, responsive to receiving the selection input signal, the minimized chat window from the control window of the chat manager and moving the detached chat window to a position on the display indicated by the selection input signal;
   third program instructions for receiving a configuration input signal from the selection device indicating the selection of a display configuration parameter, wherein the display configuration parameter specifies a particular user or a particular group of users;
   fourth program instructions for filtering out, responsive to a receipt of the display configuration parameter, one or more active chats of one or more non-specified users or groups of users in the control window;
   fifth program instructions for displaying only a plurality of graphical subdivisions in the control window, wherein each graphical subdivision represents an active chat in an instant messaging program that is allowed by the display configuration parameter and can be opened by activating the graphical subdivision; and
   sixth program instructions for making the filtered one or more active chats of the one or more non-specified users or groups of users available outside the control window in the instant messaging program;
   wherein the first, second, third, fourth, fifth, and sixth program instructions are stored on the computer readable storage medium.

6. The computer program product of claim 5, further comprising:
   seventh program instructions for receiving an activity input signal from the network connection indicating activity in the instant messaging session; and
   eighth program instructions for modifying the appearance of a graphical subdivision in the control window representing the instant messaging session according to the display configuration parameter;
   ninth program instructions for minimizing the control window; and
   tenth program instructions for automatically restoring, responsive to receiving a new instant message in one of the plurality of graphical subdivisions, the control window to a maximized size;

wherein the seventh, eighth, ninth, and tenth program instructions are stored on the computer readable storage medium.

7. The computer program product of claim 5 further comprising:
eleventh program instructions for receiving a second selection input signal from the selection device indicating the placement of a pointer over a graphical subdivision in the control window for a predetermined time interval; and
twelfth program instructions for displaying, responsive to receiving the second selection input signal, a plurality of descriptions of the instant messaging session represented by the graphical subdivision in a cloud window according to the display configuration parameter;
wherein the plurality of descriptions include a custom date format, a sender's nickname as the sender's nickname is stored in an address book, a group to which a sender of a message belongs, a phone number of the sender, a fax number of the sender, a postal address of the sender, and a fixed number of text lines from the chat; and
wherein the eleventh and twelfth program instructions are stored on the computer readable storage medium.

8. The computer program product of claim 6, further comprising:
thirteenth program instructions for receiving a second selection input signal from the selection device indicating the placement of a pointer over a graphical subdivision in the control window for a predetermined time interval; and
fourteenth program instructions for displaying, responsive to receiving the second selection input signal, a plurality of descriptions of the instant messaging session represented by the graphical subdivision in a cloud window according to the display configuration parameter;
wherein the plurality of descriptions include a custom date format, a sender's nickname as the sender's nickname is stored in an address book, a group to which a sender of a message belongs, a phone number of the sender, a fax number of the sender, a postal address of the sender, and a fixed number of text lines from the chat; and
wherein the thirteenth and fourteenth program instructions are stored on the computer readable storage medium.

9. A computer system for notifying a user of activity in an instant messaging session running on a computer comprising:
a processor, a computer readable memory, and a computer readable storage medium, wherein the computer readable storage medium does not comprise a transitory or a propagating signal;
a display device coupled to the processor;
a selection device coupled to the processor;
first program instructions to receive a selection input signal from the selection device indicating the selection and movement of a minimized chat window in a control window integrated into an existing icon in a task bar of an operating system of the computer, wherein the control window is a graphical user interface of a chat manager;
second program instructions to detach, responsive to receiving the selection input signal, the minimized chat window from the control window of the chat manager and move the detached chat window to a position on the display indicated by the selection input signal;
third program instructions to receive a configuration input signal from the selection device indicating the selection of a display configuration parameter, wherein the display configuration parameter specifies a particular user or a particular group of users;
fourth program instructions to filter out, responsive to a receipt of the display configuration parameter, one or more active chats of one or more non-specified users or groups of users in the control window;
fifth program instructions to display only a plurality of graphical subdivisions in the control window, wherein each graphical subdivision represents an active chat in an instant messaging program that is allowed by the display configuration parameter and can be opened by activating the graphical subdivision; and
sixth program instructions to make the filtered one or more active chats of the one or more non-specified users or groups of users available outside the control window in the instant messaging program;
wherein the first, second, third, fourth, fifth, and sixth program instructions are stored on the computer readable storage medium for running by the processor via the computer readable memory.

10. The computer system of claim 9 further comprising:
seventh program instructions to receive an activity input signal from the network connection indicating activity in the instant messaging session;
eighth program instructions to modify the appearance of the a graphical subdivision in the control window representing the instant messaging session according to the display configuration parameter;
ninth program instructions to minimize the control window; and
tenth program instructions to automatically restore, responsive to receiving a new instant message in one of the plurality of graphical subdivisions, the detached chat window to a maximized size;
wherein the seventh, eighth, ninth, and tenth program instructions are stored on the computer readable memory for running by the processor via the computer readable storage memory.

11. The computer system of claim 9 further comprising:
eleventh program instructions to receive a second selection input signal from the selection device indicating the placement of a pointer over a graphical subdivision in the control window for a predetermined time interval; and
twelfth program instructions to display, responsive to receiving the second selection input signal, a plurality of descriptions of the instant messaging session represented by the graphical subdivision in a cloud window according to the display configuration parameter;
wherein the plurality of descriptions include a custom date format, a sender's nickname as the sender's nickname is stored in an address book, a group to which a sender of a message belongs, a phone number of the sender, a fax number of the sender, a postal address of the sender, and a fixed number of text lines from the chat; and
wherein the eleventh and twelfth program instructions are stored on the computer readable storage medium for running by the processor via the computer readable memory.

12. The computer system of claim 10 further comprising:
thirteenth program instructions to receive a second selection input signal from the selection device indicating the placement of a pointer over a graphical subdivision in the control window for a predetermined time interval; and
fourteenth program instructions to display, responsive to receiving the second selection input signal, a plurality of descriptions of the instant messaging session represented by the graphical subdivision in a cloud window according to the display configuration parameter;

wherein the plurality of descriptions include a custom date format, a sender's nickname as the sender's nickname is stored in an address book, a group to which a sender of a message belongs, a phone number of the sender, a fax number of the sender, a postal address of the sender, and a fixed number of text lines from the chat; and wherein the thirteenth and fourteenth program instructions are stored on the computer readable storage medium for running by the processor via the computer readable memory.

* * * * *